United States Patent Office 3,504,052
Patented Mar. 31, 1970

3,504,052
ORGANOMETALLIC POLYMERS
Eberhard W. Neuse, Santa Monica, and Edward Quo, Inglewood, Calif., assignors, by mesne assignments, to McDonnell Douglas Corporation, Santa Monica, Calif., a corporation of Maryland
No Drawing. Filed Oct. 6, 1964, Ser. No. 402,005
Int. Cl. C08g 1/18, 15/00, 45/06
U.S. Cl. 260—836
14 Claims

ABSTRACT OF THE DISCLOSURE

This invention is directed to the provision of a novel class of polymers containing ruthenocene or osmocene units, which are interlinked to form polymeric products of high heat stability and having a variety of other advantageous properties, by reacting a mixture of a metallocene selected from the class consisting of ruthenocene and osmocene, with an aldehyde or a ketone in the melt phase and in the presence of a Lewis acid catalyst.

---

This invention relates to organometallic compounds and, more specifically, to novel polymeric organo-ruthenocene and organo-osmocene compounds, and to the method for their preparation.

Organometallic compounds offer great interest in a vast number of technical and scientific applications. For instance, tetraethyl lead has been employed as an effective anti-knock agent, organo-magnesium, organo-zinc and organo-mercury have long been used as reactants in preparative organic chemistry, organo-mercury compounds have also been utilized as fungicides, and organo-tin derivatives have been in use as stabilizers for vinyl plastics. Other organo-metallics with useful industrial applications include organo-titanium, organo-zirconium, organo-hafnium, organo-manganese and organo-boron compounds. A class of organo-metallics containing group VIII transition metals, notably iron, cobalt and nickel, has gained special importance as anti-knock agents, combustion and redox catalysts and also as intermediates in organic reactions, and other applications.

Useful derivatives of the latter metals include such compounds as carbonyls and π-cyclopentadienyl derivatives, preferably di-π-cyclopentadienyl derivatives. In the latter compounds, commonly and generally termed metallocenes, the metals are π-bonded in a sandwich-like manner between two essentially parallel cyclopentadienyl rings. Those metallocenes of the general composition $C_{10}H_{10}M$ illustrated by Structure I below, in which M stands for iron, ruthenium or osmium as center atoms, are of exceptional chemical and thermal stability by virtue of their electronic configuration.

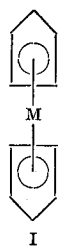

I

This stability has been found to increase in the order dicyclopentadienyl - iron < dicyclopentadienyl-ruthenium < dicyclopentadienyl-osmium. For these π-dicyclopentadienyl compounds of iron, ruthenium and osmium, commonly referred to as ferrocene, ruthenocene and osmocene, respectively, and many of their derivatives, utilization thereof has been indicated as redox and combustion catalysts, anti-knock agents, dielectrics, lubricants, hydraulic fluids, chemical intermediates, ultraviolet absorbers, etc.

However, in contrast to monomers of the aforementioned kind, which are generally incoherent crystalline or liquid materials, polymeric compounds containing, for example, ferrocene, have been found to offer the significant advantage that they can be made into coherent films, coatings, sealants, potting agents, adhesives and structural materials, thus combining the desirable chemical and physical characteristics of the monomeric parent compound with the resin-forming properties of the polymeric products. Various polymeric derivatives of ferrocene are known. However, no polymers containing the ruthenium or osmium analogs have been heretofore produced. In view of the high stability of such analogs, polymers thereof would afford particular advantages and utility.

It is, therefore, an object of the present invention to provide a new class of polymeric compounds containing ruthenium or osmium.

A more specific object is to provide a class of polymers comprising either ruthenocene or osmocene units, these dicyclopentadienyl-metal units being interlinked by a carbon atom, which may or may not carry other substituents.

A still further object is to provide a process of preparing such organo-ruthenium or organo-osmium polymers.

The novel compounds produced according to our invention are polymeric, with recurring units composed of essentially disubstituted metallocenylene units to which there is attached an unsubstituted or variously substituted methylene group. These recurring units may be represented by the formula $\{C_{10}H_8M-C(R')(R'')\}$, having the structure represented by Formula I(a) below:

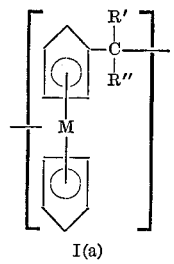

I(a)

where M is ruthenium (Ru) or osmium (Os), and $C_{10}H_8M$ represents the disubstituted metallocenylene radical. R' and R" each can be hydrogen or an organic radical, e.g., alkyl, such as methyl, ethyl, isopropyl, tert-butyl, pentyl, hexyl, 2-ethyl butyl, and the like; aryl, such as phenyl, naphthyl, phenanthryl; aralkyl or alkaryl, such as benzyl, benzhydryl, phenylethyl, naphthylmethyl, tolyl, xylyl, ethylphenyl, ethylnaphthyl. R' and R" can also be heterocyclic radicals, such as furyl, pyridyl, pyrazolyl, and the thiophene radical. R' and R" can also comprise variously substituted alkyl, aryl, aralkyl, alkaryl or heterocyclic groups. These substituents can be functional side groups such as, carboxyl, hydroxyl, alkoxy, preferably lower alkoxy, e.g., methoxy or ethoxy, halogen, such as chlorine, bromine or fluorine, amino and including substituted amino, e.g., dimethylamino, cyano groups and unsaturated groups, such as alkenyl, e.g., propenyl, or the unsaturated double bond of the above noted furyl radical, and other substituents, e.g., nitro, which can undergo additional reaction, e.g., reduction. Where R' and/or R" are aromatic, e.g., phenyl, the aforementioned substituents, such as, hydroxy, carboxy, alkoxy, halogen, cyano, amino and nitro groups can be present in any of the ortho, meta or para positions of the aromatic nucleus, preferably ortho and para. The total number of carbon atoms in such organic radical is preferably no greater than about 15, and usually ranges from about 1 to about 10 C atoms. Preferably, at least one of the radicals R' and R" is hydrogen.

The overall general structure of these polymers can be represented by the formula noted below:

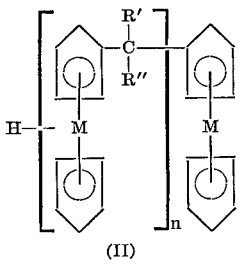

(II)

In this formula, R' and R" and M are as heretofore defined and $n$ is a positive integer, e.g., $n$ can range from 1 to approximately 50 or higher, depending on type of substituent groups R' and R", reaction conditions and extent of subfractionation. Usually, $n$ is in the range of from 1 to about 30. Thus, the polymers can have a low value for $n$, e.g., 2 to 4 in the case of oligimers, but the preferred polymers are of higher molecular weight and have a higher value of $n$ of the order of about 5 to about 30. Such polymers can have number-average molecular weights, $M_n$, ranging from about 500 to about 20,000, usually from about 500 to about 10,000, as measured by vapor pressure osmometry. For osmocene polymers, the lower limit of $M_n$ in the above ranges generally is about 600.

In Formula II the position of the substituent link on the left hand side conventionally implies a mixed substitution pattern in which the recurring units comprise 1,2-, 1,2- and 1,1'-disubstituted metallocenylene groups as shown in Formulae III(a), III(b), III(c) below:

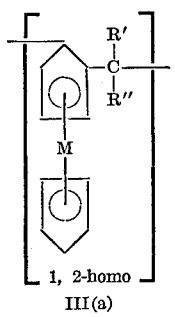 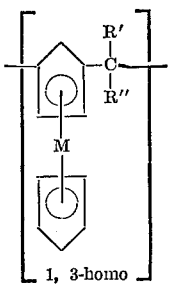 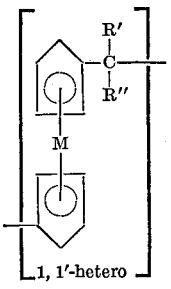

1, 2-homo  1, 3-homo  1, 1'-hetero
III(a)     III(b)     III(c)

The above variously substituted isomeric recurring units III(a), III(b) and III(c) are arranged randomly along the polymer chain of II.

The preparation of the polymers II described in our invention is carried out by reacting the metallocene, that is, either ruthenocene or osmocene, with suitable substituted or unsubstituted aldehydes or ketones having the general formula R'COR", where R' and R" have the values noted above, in the presence of Lewis acid catalysts. In lieu of the free aldehydic or ketonic reactants, suitable derivatives of such carbonyl compounds capable of releasing an aldehyde or ketone under conditions of the reaction can be employed. Examples of such derivatives are trioxane, which is a cyclic trimer of formaldehyde, or dimethoxymethane, which is the dimethyl acetal of formaldehyde. Examples of suitable aldehydes and ketones include acetaldehyde, benzaldehyde, naphthaldehyde, acetone, acetophenone, benzophenone, and the like. Substituted carbonyl reactants, e.g., aldehydic or ketonic reactants, containing unsaturated or functional side groups also can be employed. Examples of such aldehyde and ketone reactants include carboxybenzaldehyde, cyanobenzaldehyde, hydroxybenzaldehyde, methoxybenzaldehyde, dimethylaminobenzaldehyde, crotonaldehyde, chloral, furfural, p-methoxyacetophenone, p-hydroxyacetophenone, p-carboxy benzophenone, hexafluoroacetone, and the like. The reaction can essentially be represented by the following general equation, in which M, R' and R" are as set forth above:

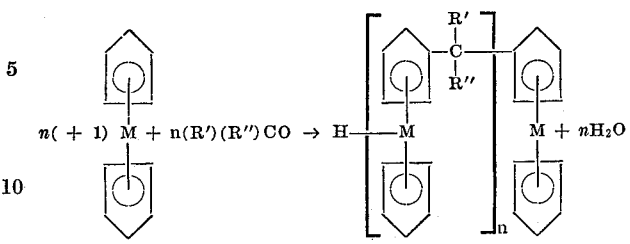

In order to attain high conversion to polymeric products it is necessary to conduct the condensations in the melt phase, with temperatures adjusted so as to maintain the melt in a stirrable consistency. Temperatures can thus be in the range from approximately 80° to about 200° C. In general, higher temperature levels within the above range, such as between about 130° and about 170° C., are usually preferred. As catalysts, weak or strong Lewis acids can be employed. Examples are aluminum chloride, zinc chloride, boron trifluoride and stannic chloride. Those Lewis acids that exhibit a high degree of hydrolytic stability are most effective; a typical representative is zinc chloride. Catalyst concentrations can be as low as 1% or as high as approximately 30%, by weight of metallocene. It is generally preferable to employ catalyst concentrations in the 10–25% range. The molar reactant ratio of metallocene to carbonyl compound can vary within a wide range. A preferred range is from approximately 0.2 to 3.0, depending on the reaction conditions, such as temperature, type and concentration of catalyst, and reactivity of the carbonyl reactant. To avoid undue crosslinking or incorporation of carbonyl compound in excess over the stoichiometry of structure II, it is generally preferable to employ metallocene to carbonyl compound molar ratios approximating or exceeding unity, most desirably in the range from about 0.9 to about 2.0. As metallocene to carbonyl compound ratios, decrease below unity, intermolecular crosslinking bridges are formed progressively, especially if heating periods are extended and/or catalyst concentrations and temperatures are raised. These crosslinked polymers are insoluble and infusible solids.

The reactions are advantageously conducted under a blanket of nitrogen to prevent oxidation by air. The reaction mixture is heated with stirring in the melt phase, until the melt has turned into a sticky, highly viscous resin or has even solidified so as to block the stirrer. Solubility tests on samples drawn periodically from the melt aid in determining the proper end-point of the condensation. In such cases, where the carbonyl compound reactant is highly volatile, such as in the case of formaldehyde (e.g., as dimethyl acetal) or acetaldehyde, the reactions are conducted in a closed system, e.g., in a sealed glass ampule. Work-up of the reaction products is generally accomplished by water extraction to remove catalyst and some unreacted carbonyl compound. This water extraction is followed by dissolution of the reaction mass in a suitable organic solvent such as dioxane, dimethylformamide, benzene, toluene, N-methylpyrrolidone, and the like. From the filtered solution, a major high molecular weight polymer portion, for convenience termed "First Fraction," is precipitated by the addition of an appropriate precipitant, e.g., isopropanol, methanol, hexane, pentane, or acetone. After separation of this fraction by filtration, from the motherliquor a second, low-molecular-weight polymer portion, designated as "Second Fraction" and usually much smaller than the preceding first fraction, is precipitated by adding water, and is isolated by filtration. If the original solvent employed is not of the water-miscible type, benzene and toluene being examples thereof, the major portion of this solvent is removed from the motherliquor prior to the addition of water; this removal is preferably accomplished by distillation under vacuum. The fractions thus isolated, notably the higher molecular first fraction, require a rigorous drying treatment to remove traces of solvent which are often included and difficult to remove. The dried products generally constitute white-to-grayish powdery solids which are soluble in a number of organic solvents and, in some instances, are fusible up to about 300° C.

The degree of solubility and fusibility of the polymers of the invention depends on the average molecular weight and also on the nature of the substituents R′ and R″ in Formula II. In general with R′ and R″ being hydrogen, or low molecular alkyl, aryl, or aralkyl, e.g., of from 1 to about 9 carbon atoms, the resulting polymers have excellent solubility in such solvents as aromatics, halohydrocarbons, cyclic ethers, dimethylformamide, and the low-molecular-weight second fractions have additional limited to good solubility in ketones, alcohols, and aliphatic hydrocarbons. With one or both radicals R′ and R″ representing long-chain alkyl, e.g., from about 5 to about 12 carbon atoms, or an alkyl or aryl residue to which there is attached a functional side-group of the type mentioned above, e.g., hydroxyl or carboxyl, the polymers obtained may exhibit somewhat decreased solubility in such solvents as aromatics and halohydrocarbons. Instead, solubility in certain other solvents can be improved depending on the type of the functional side-group present. Thus, if one or both radicals R′ and R″ are hydroxyphenyl, the polymer shows enhanced solubility in alcohols, in which for instance, the corresponding polymeric product with R′=phenyl and R″=hydrogen is practically insoluble.

The polymers obtained in the present invention can be cast from solution or, if fusible, from the melt, to form clear, transparent films. If R′ and/or R″ comprise a functional side-group, such as a carboxy, hydroxy, amino, chloralkyl group or an unsaturated moiety, such as alkenyl or furyl, the resulting polymers can be cured, i.e., cross-linked, to form insoluble, infusible products. For instance, a polymer in which R′ and/or R″ is 4-carboxyphenyl, can be crosslinked by interacting it with a diepoxy compound, such as the diglycidyl ether of bisphenol A or of resorcinol. Further, for example, a polymer in which R′ and/or R″ is 2-methoxyphenyl can be cured by condensing it with phenolic-type pre-polymers, i.e., phenolic resins in the A-stage, in which case the hydroxymethyl groups present in the phenolic resin react with the phenyl nuclei of the methoxyphenyl group R′ and/or R″. A polymer in which R′ and/or R″ is 4-carboxyphenyl can also be cured with diepoxy compounds of the type indicated above. A polymer in which R′ and/or R″ is propenyl or furyl can be cured by reacting it either per se, or in the presence of other unsaturated crosslinking agents, such as styrene, maleic anhydride, methyl methacrylate or acrylonitrile, using a radical-type initiator, e.g., azo-bis-isobutyronitrile.

The polymers of the present invention possess outstanding catalytic and radiation absorbing properties. Thus, they are useful as redox and combustion catalysts, electron exchange resins and ultraviolet radiation absorbers in the far UV region, i.e., the ultraviolet region, at, and below, 200 m$\mu$. Since the invention polymers fail to absorb, or show only minor absorption, in the region of electromagnetic radiation from approximately 370 to 500 m$\mu$, they are especially useful in such applications where "whiteness," i.e., transparency to radiation in the stated region, is required. In addition, the invention polymers are nonvolatile even at elevated temperatures, e.g., of the order of about 200° C., where most monomeric compounds employed as catalysts and ultraviolet absorbers show more or less pronounced volatility. Another useful feature of the polymers of our invention is their excellent heat stability.

Thus, the polymers of our invention are of particular usefulness in such applications that call for resistance toward the combined effects of ultraviolet radiation, heat and vacuum, while at the same time requiring transparency in that portion of the electromagnetic radiation spectrum which is characterized by wave lengths ranging from approximately 370 to 500 m$\mu$. The polymers can be utilized in the aforementioned applications per se, e.g., as fillers distributed in an appropriate matrix or binder system, or as thin films cast from melt or solution, preferably with additional support by suitable window materials, such as glass, quartz, and the like. Those polymers in which R′ and/or R″ represent a moiety which comprises a functional group of any of the types mentioned above, can also be used in crosslinked form, i.e., as insoluble, infusible materials in which the said functional groups have interacted with suitable crosslinking agents. Such crosslinked polymers offer the further advantage that they can be applied as hard, coherent, resinous materials in coatings, sealants and the like, without additional support or protection.

The examples given below illustrate practice of the present invention. In these examples, all starting materials were commercially available with the exception of osmocene, which was prepared from osmium tetrachloride and cyclopentadienylsodium in tetrahydrofuran as described by M. D. Rausch et al. in J. Am. Chem. Soc., 82, 76 (1960).

EXAMPLE 1

(Condensation of ruthenocene with benzaldehyde. Formation of polymer II, with M=Ru, R′=phenyl, R″=hydrogen)

A mixture of 0.463 g. (2.0 mmoles) of ruthenocene, 0.212 g. (2.0 mmoles) of freshly distilled benzaldehyde and 0.095 g. of anhydrous zinc chloride was heated with stirring for 10 hours at 140° C. During the reaction, a steady stream of dry nitrogen was slowly passed over the melt. The highly viscous reaction product was cooled to room temperature, the solid mass was crushed and thoroughly washed with warm water and was dried for 24 hours at 50° C. under vacuum. The product was then dissolved in 5 ml. of benzene. The filtered solution was slowly poured into 20 ml. of stirred isopropanol to give a solid precipitate. After vacuum-drying for 12 days at 50° C., this fraction weighed 0.180 g. (29.4% yield) and showed the melting range 125–140° C. The number-average molecular weight, $M_n$, determined in benzene solution, was 1860.

*Analysis.*—Calculated for polymer II (with M=Ru, R′=phenyl, R″=hydrogen) (percent): C, 62.29; H, 4.40; Ru, 33.31. Found (percent): C, 62.12; H, 4.34; Ru, 32.79.

The mother liquor, after removal of the major portion of benzene under vacuum at room temperature, was poured into excess water, and the precipitated solids, after water washing, were dried for 24 hours at 40° C. under vacuum. Removal of unreacted ruthenocene by vacuum sublimation left 0.105 g. (18.0% yield) of a nearly white, powdery solid, which was termed second fraction. The number-average molecular weight, $M_n$, was 840.

*Analysis.*—Calculated (percent): C, 60.61; H, 4.39. Found (percent): C, 60.87; H, 4.45.

Both fractions dissolved readily in benzene, chloroform, dioxane and cyclohexanone, and could be cast from solution or melt to tarnsparent, colorless films. By further fractionation of the first fraction, employing conventional precipitation techniques with benzene as solvent and isopropanol as precipitant, a number of subfractions was obtained. A typical subfraction, $M_n$ 18,200, showed the following elemental analytical data: C, 63.96; H, 4.48.

EXAMPLE 2

(Condensation of ruthenocene with o-methoxybenzaldehyde. Formation of polymer II, with M=Ru, R′=2-methoxyphenyl, R″=hydrogen)

A mixture of 0.463 g. (2.0 mmoles) of ruthenocene, 0.272 g. (2.0 mmoles) of freshly distilled o-methoxybenzaldehyde (o-anisaldehyde) and 0.049 g. of anhydrous zinc chloride was heated for 2.8 hours at 150° C. in the manner described in the preceding example. At the end of the heating period, the melt had almost completely solidified, preventing further stirring. Work-up as in Example 1 yielded, besides 0.10 g. of crosslinked insoluble polymer, 0.25 g. (37.4% yield) of the first fraction. The product, a light-gray powder melting in the range 160–180° C., $M_n$ 3400 (benzene), was soluble in benzene, chloroform, dioxane and cyclohexanone and was castable to clear, transparent films.

*Analysis.*—Calculated for polymer II (with M=Ru, R'=2-methoxyphenyl, R''=hydrogen) (percent): C, 61.19; H, 4.60. Found (percent): C, 61.49; H, 4.60.

The second fraction, 0.065 g. (10.2% yield), an off-white powder, showed $M_n$ 1290 (benzene), melting range 150–190° C.

*Analysis.*—Calculated (percent): C, 60.08; H, 4.57. Found (percent): C, 58.79; H, 4.69.

EXAMPLE 3

(Condensation of ruthenocene with p-carboxybenzaldehyde. Formation of polymer II, with M=Ru, R'=4-carboxyphenyl, R''=hydrogen)

A well-ground mixture of 0.509 g. (2.2 mmoles) of ruthenocene, 0.300 g. (2.0 mmoles) of p-carboxybenzaldehyde and 0.076 g. of anhydrous zinc chloride was heated for 0.8 hours at 205° C. in the manner described in Example 1. The reaction product was washed with water and was precipitated from 40 ml. of peroxide-free dioxane solution using 120 ml. of water. The grayish solids precipitated were extracted with pentane for removal of admixed ruthenocene and were dried for 7 days at 50° C. under vacuum. The product, an off-white powder, which did not melt up to 300° C., comprised the total polymer formed. The yield was 0.185 g. (21.0%); $M_n$ 1300 (pyridine).

*Analysis.*—Calculated for polymer II (with M=Ru, R'=4-carboxyphenyl, R''=hydrogen) (percent): C, 58.17; H, 3.97. Found (percent): C, 58.42; H, 4.11.

The polymer dissolved readily in dioxane, sulfolane (cyclic tetramethylene sulfone), pyridine and was castable from these solutions to transparent films.

EXAMPLE 4

(Condensation of ruthenocene with 2-furaldehyde. Formation of II, with M=Ru, R'=2-furyl, R''=hydrogen)

The mixture of 0.695 g. (3.0 mmoles) of ruthenocene, 0.192 g. (2.0 mmoles) of freshly distilled 2-furaldehyde (furfural) and 0.090 g. of anhydrous zinc chloride was heated for 2 hours at 130° C. in the manner described in Example 1. At the end-point of the reaction, the mass had become highly viscous and "stringy," i.e., strings could be pulled from the hot melt. Work-up as in Example 1, using dioxane as solvent and isopropanol as precipitant (water for precipitation of the second fraction), resulted in isolation of 0.251 g. (28.2% yield) of the first fraction and 0.321 g. (22.9% yield) of the second fraction. Both fractions, grayish-white powders, were soluble in dioxane, N-methyl pyrrolidone, chlorohydrocarbons and cyclohexanone, but insoluble in water. They could be cast to clear films from these solutions; the second fraction could also be cast from the melt. The first fraction showed $M_n$ 1790 (cyclohexanone).

*Analysis.*—Calculated for polymer II (with M=Ru (percent), R'=2-furyl, R''=hydrogen) (percent): C, 57.42; H, 3.97. Found (percent): C, 57.83; H, 4.09.

The second fraction exhibited an $M_n$ value of 720 and analyzed as follows: C, 56.01; H, 4.20.

EXAMPLE 5

(Condensation of ruthenocene with formaldehyde. Formation of polymer II, with M=Ru, R'=R''=hydrogen)

A mixture of 1.157 g. (5.0 mmoles) of ruthenocene, 0.419 g. (5.5 mmoles) of dimethoxymethane (formaldehyde dimethylacetal) and 0.220 g. of anhydrous zinc chloride was heated under nitrogen for 5 hours at 170° C. The semi-resinous reaction mixture was thoroughly washed with water, dried under vacuum and dissolved in 5 ml. of benzene. From the filtered solution a first and a second fraction were collected in the manner described in Example 1. The total yield was 0.345 g. The first fraction, a cream-colored solid, melted at 90–110° C. and had $M_n$ 1720.

*Analysis.*—Calculated for polymer II (with M=Ru, R'=R''=hydrogen)(percent): C, 53.98; H, 4.17; Ru, 41.85. Found (percent): C, 54.19; H, 4.28; Ru, 40.99.

The second fraction, an off-white solid, melting range 90–120° C., had $M_n$ 710.

*Analysis.*—Calculated (percent): C, 53.54; H, 4.21. Found (percent): C, 53.91; H, 4.29.

Both fractions dissolved readily in benzene, chlorohydrocarbons, dioxane, N-methylpyrrolidone and dimethyl sulfoxide, and could be cast to transparent, colorless films from these solutions and also from the melt. Further fractionation of the first fraction, employing conventional precipitation techniques, resulted in subfractions of enhanced monodispersity. A typical high-molecular-weight subfraction, obtained as a cream-colored powder, $M_n$ 17,100, gave the following elemental analytical data: C, 54.31; H, 4.21.

Where in the afore-described procedure, the amount of dimethoxymethane was increased to 0.840 g. (11.0 mmoles), the total polymer yield was 0.418 g., and the first fraction, $M_n$ 1950, melted in the range 90–120° C. and gave the following analytical data: C, 55.31, H, 4.28; Ru, 40.10.

EXAMPLE 6

(Condensation of osmocene with formaldehyde. Formation of polymer II, with M=Os, R'=R''=hydrogen)

A procedure was carried out substantially as described in the preceding example, employing 0.160 g. (0.5 mmole) of osmocene, 0.038 g. (0.5 mmole) of dimethoxymethane and 0.092 g. of anhydrous zinc chloride, and heating at 180° C. The total heating time was 12 hours. Work-up as described in Example 5 gave two polymer fractions as off-white powders in a total yield of 0.052 g. The first fraction had $M_n$ 2010 (benzene).

*Analysis.*—Calculated for polymer II (with M=Os, R'=R''=hydrogen) (percent): C, 39.38; H, 3.306. Found (percent): C, 39.52; H, 3.32.

Both fractions showed the same solubility characteristics as the analogous ruthenocene polymers described in the preceding example. They could be cast from solution to transparent, colorless films.

EXAMPLE 7

(Condensation of ruthenocene with benzophenone. Formation of polymer II with M=Ru, R'=R''=phenyl)

Employing the techniques used in Example 5, the mixture of 0.116 g. (0.50 mmole) of ruthenocene, 0.091 g. (0.50 mmole) of benzophenone and 0.025 g. of anhydrous zinc chloride was heated for 9 hours at 135° C. The melt was worked up as in Example 1 to give two polymer fractions, grayish-white powdery solids, in a total yield of 0.032 g. (18.0%). The first fraction, $M_n$ 1380 (benzene), began to melt in the 170–200° C. region and dissolved readily in benzene, chloroform, dioxane.

*Analysis.*—Calculated for polymer II (with M=Ru, R'=R''=phenyl) (percent): C, 66.93; H, 4.55. Found (percent): C, 67.51; H, 4.79.

EXAMPLE 8

(Condensation of osmocene with p-carboxybenzaldehyde. Formation of polymer II, with M=Os, R'=4-carboxyphenyl, R''=hydrogen)

A procedure was carried out as in Example 3, using the molar reactant ratios given therein, except that osmocene was employed in place of ruthenocene, the catalyst concentration was doubled and heating was extended over a period of 3 hours. Work-up as in Example 3 produced an off-white, powdery polymer, which did not melt up to 300° C., dissolved readily in pyridine, dioxane and sulfolane, and was insoluble in water, methanol and pentane; $M_n$ 1530 (pyridine).

EXAMPLE 9

(Condensation of osmocene with benzaldehyde. Formation of polymer II, with M=Os, R'=phenyl, R"=hydrogen)

A procedure was carried out substantially as described in Example 1, using the molar reactant ratios given therein, except that osmocene was employed in place of ruthenocene and the temperature was raised to 170° C. The first fraction of the resulting polymer was an off-white powder which began to melt in the 150–170° C. range and dissolved in aromatic hydrocarbons, dioxane and pyridine. $M_n$ was found to be 1990 (benzene). The second fraction contained oligomeric product; it was a white powder, melting range 130–145° C. and dissolved in the same solvents as stated above.

EXAMPLE 10

(Film formation from polymer of Example 5)

A sample of the first polymer fraction obtained in Example 5 was dissolved in benzene-cyclohexanone (50:50) so as to give a 5% solution. By means of a spray gun, at an air stream pressure of 45 p.s.i., this solution was sprayed onto a quartz disc of 1 inch diameter, which was dried for 24 hours at 40° C. under vacuum. There was thus obtained a transparent film of 0.005 inch thickness, which can be increased by applying several coatings in the manner above described. "Sandwiched" between quartz windows or other suitable materials transparent to visible light, this film can be used in ultraviolet absorbing multi-layer window systems.

EXAMPLE 11

(Film formation from polymer of Example 6)

Using a sample of the first polymer fraction of Example 6, a film of 0.02 inch thickness was deposited onto a polished quartz plate by means of a spray gun as in the preceding example. The solvent employed was cyclohexanone. After briefly drying the coating at 50°, a second polished quartz plate was attached to the coated side. The "sandwich" was heated at 150° C. until the polymer film had become uniformly molten between the plates, and was then cooled to room temperature. The window system thus obtained can be used as in the preceding example.

EXAMPLE 12

(Crosslinking of 4-carboxyphenyl-substituted polymer II by means of a diepoxide)

0.085 g. of the polymer obtained in Example 3 was intimately mixed at 80° C. with 0.150 g. of the diglycidyl ether of 2,2-bis(4-hydroxyphenyl)propane, the said ether being available commercially under the trade name Epon 828 (Shell Chemical Co.). The mixture was cured for 5 hours at 100° C., followed by 10 hours at 140° C. It was then post-cured for 2 hours at 180° C. The resulting product was a translucent, very hard and tough resin.

From the foregoing, it is seen that the invention provides a novel class of polymers containing ruthenocene or osmocene units, which are interlinked to form polymeric products of high heat stability and having a variety of other advantageous properties rendering such polymeric products highly versatile and useful in numerous important aplications. By attaching functional side groups to such polymers as previously described, such polymers can be crosslinked or reacted with other materials having reactive groups, such as epoxy compounds, to produce improved hard and tough coatings, adhesives and sealants, and for other applications. The instant invention also affords procedure for readily polymerizing the monomeric ruthenocene and osmocene to produce the above-noted polymeric products of the invention.

While we have described particular embodiments of our invention for the purpose of illustration, it should be understood that various modifications and adaptations thereof may be made within the spirit of the invention, as set forth in the appended claims.

We claim:

1. A polymeric product comprising polymers having the formula

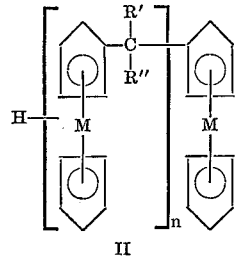

II wherein R' and R" are each a member selected from the group consisting of hydrogen and an organic radical selected from the group consisting of alkyl, aryl, aralkyl, alkaryl and heterocyclic radicals, $n$ is a positive integer, and M is ruthenium.

2. A polymeric product as defined in claim 1, wherein $n$ is a positive integer of from 1 to about 50.

3. A polymeric product as defined in claim 1, wherein $n$ is a positive integer of from about 5 to about 30.

4. A polymeric product as defined in claim 1, wherein said organic radical includes a functional side group selected from the class consisting of carboxyl, hydroxyl, alkoxy, halogen, amino, cyano, nitro and unsaturated groups.

5. A polymeric product comprising polymers having the formula

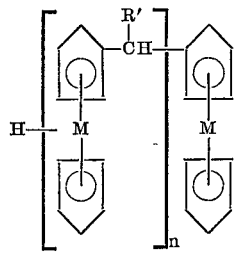

wherein R' is a member selected from the group consisting of hydrogen and an organic radical selected from the group consisting of alkyl, aryl, aralkyl, alkaryl, and heterocyclic radicals, $n$ is a positive integer of from 1 to about 50, and M is ruthenium.

6. A polymeric product as defined in claim 5, wherein said organic radical includes a functional side group selected from the class consisting of carboxyl, hydroxyl, alkoxy, halogen, amino, cyano, nitro and unsaturated groups.

7. A polymeric product as defined in claim 5, wherein R' is hydrogen, and the number-average molecular weight of said polymer ranges from about 500 to about 20,000.

8. A polymeric product as defined in claim 5, wherein R' is alkyl, and the number-average molecular weight of said polymer ranges from about 500 to about 10,000.

9. A polymeric product as defined in claim 5, wherein R' is aryl, and the number-average molecular weight of said polymer ranges from about 500 to about 20,000.

10. A polymeric product as defined in claim 5, wherein R' is aryl and carries a carboxyl group.

11. A polymeric product as defined in claim 5, wherein R' is aryl and carries an alkoxy group.

12. A polymeric product as defined in claim 5, wherein R' is aryl and carries a hydroxy group.

13. A polymeric product as defined in claim 10, cross-linked by a diepoxy compound.

14. A polymeric product as defined in claim 12, cross-linked by a diepoxy compound.

References Cited

UNITED STATES PATENTS

| | | | |
|---|---|---|---|
| 2,694,721 | 11/1954 | Weinmayr | 260—439 |
| 2,709,175 | 5/1955 | Graham | 260—439 |
| 3,238,185 | 3/1966 | Neuse | 260—439 |
| 3,341,495 | 9/1967 | Neuse | 260—67 |

OTHER REFERENCES

Kotrelev et al., 55 Chem. Abstracts 25341 (1961).

Pauson et al., "Jour. Chem. Soc.," London, 1962, pp. 3880–6.

Rausch et al., "Chemistry and Industry," June 1958, pp. 756–7.

Wilkinson, "Jour. American Chem. Soc.," vol. 74, December 1952, pp. 6146–7.

SAMUEL H. BLECH, Primary Examiner

U.S. Cl. X.R.

117—161; 161—192; 252—426; 260—2, 30.2, 30.4, 30.8, 32.6, 32.8, 33.4, 33.6, 33.8, 47, 63, 67, 429, 830, 837, 838, 845, 875, 881, 885, 886.